United States Patent
Ordway et al.

(10) Patent No.: US 10,246,370 B2
(45) Date of Patent: Apr. 2, 2019

(54) COLOR-STRIKABLE GLASS CONTAINERS

(71) Applicant: Owens-Brockway Glass Container Inc., Perrysburg, OH (US)

(72) Inventors: Edward Ordway, Toledo, OH (US); Terence K. Howse, Toledo, OH (US); Daniel Baker, Haslett, MI (US); Stephen Barton, Dansville, NY (US); Carol A. Click, Corning, NY (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 15/639,452

(22) Filed: Jun. 30, 2017

(65) Prior Publication Data

US 2017/0297950 A1  Oct. 19, 2017

Related U.S. Application Data

(63) Continuation of application No. 13/666,629, filed on Nov. 1, 2012, now Pat. No. 9,725,354.

(51) Int. Cl.
| | |
|---|---|
| *C03B 32/00* | (2006.01) |
| *C03C 1/10* | (2006.01) |
| *C03C 4/02* | (2006.01) |
| *C03C 3/087* | (2006.01) |
| *C09C 1/00* | (2006.01) |
| *C03C 3/078* | (2006.01) |
| *C03B 9/13* | (2006.01) |

(52) U.S. Cl.
CPC ............ *C03C 4/02* (2013.01); *C03B 32/00* (2013.01); *C03C 3/078* (2013.01); *C03C 3/087* (2013.01); *C09C 1/0009* (2013.01); *C03B 9/13* (2013.01); *Y10T 428/131* (2015.01)

(58) Field of Classification Search
CPC ........................................................ C03C 4/02
See application file for complete search history.

(56) References Cited

U.S. PATENT DOCUMENTS

| | | |
|---|---|---|
| 1,242,336 A | 10/1917 | Fitts |
| 2,174,554 A | 10/1939 | Dobrovolny et al. |
| 2,233,343 A | 2/1941 | Dobrovolny et al. |
| 2,653,419 A | 9/1953 | Brenner et al. |
| 2,672,423 A | 3/1954 | Lobdell et al. |
| 2,922,720 A | 1/1960 | Parks |

(Continued)

OTHER PUBLICATIONS

PCT Int. Search Report and Written Opinion, Int. Serial No. PCT/US2013/063199, Int. Filing Date: Oct. 3, 2013, Applicant: Owens-Brockway Glass Containers Inc., dated Jan. 13, 2014.

(Continued)

*Primary Examiner* — Cynthia Szewczyk

(57) ABSTRACT

Latent colorant material compositions, soda-lime-silica glass compositions, and related methods of manufacturing color-strikable glass containers. The latent colorant material compositions may be introduced into a plurality of base glass compositions having redox numbers in the range of −40 to +20 to produce color-strikable glass compositions and color-strikable glass containers. The latent colorant material compositions introduced into the base glass compositions include a mixture of cuprous oxide ($Cu_2O$), stannous oxide (SnO), bismuth oxide ($Bi_2O_3$), and carbon (C). After formation, the color-strikable glass containers may be heat-treated to strike red or black therein.

12 Claims, 1 Drawing Sheet

(56) References Cited

U.S. PATENT DOCUMENTS

| | | | |
|---|---|---|---|
| 2,923,635 | A | 2/1960 | Beck, Sr. |
| 3,498,806 | A | 3/1970 | Hammer et al. |
| 3,513,003 | A | 5/1970 | Hammer et al. |
| 3,627,548 | A | 12/1971 | Hammer et al. |
| 4,312,953 | A | 1/1982 | Mills et al. |
| 7,612,003 | B2 | 11/2009 | Lefevre et al. |
| 7,659,221 | B2 | 2/2010 | Arbab et al. |
| 7,902,097 | B2 | 3/2011 | Cid-Aguilar et al. |
| 2003/0121916 | A1 | 7/2003 | Ishihara |
| 2003/0205062 | A1 | 11/2003 | Sakai et al. |
| 2005/0061033 | A1 | 3/2005 | Petrany et al. |
| 2006/0211563 | A1 | 9/2006 | Arbab et al. |
| 2007/0021288 | A1 | 1/2007 | Lefevre et al. |
| 2008/0163649 | A1 | 7/2008 | Arbab et al. |
| 2008/0269038 | A1 | 10/2008 | Schneider et al. |
| 2010/0004111 | A1 | 1/2010 | Kobayashi et al. |
| 2010/0101275 | A1 | 4/2010 | Abensour et al. |
| 2011/0274916 | A1 | 11/2011 | Murata |
| 2012/0196126 | A1 | 8/2012 | Axtell, III et al. |

OTHER PUBLICATIONS

W. Simpson and D. D. Myers, "The Redox Number Concept and its Use by the Glass Technologist", Glass Technology, vol. 19, No. 4, Aug. 1978.
Chile Examiners Report, Serial No. 201501076, Applicant: Owens-Brockway Glass Container Inc, dated Jun. 6, 2018.
Third-Party Observations filed in European Application No. 13777209 and received by the EPO on Jul. 11, 2018 (French language).
Machine Translation of the Third-Party Observations filed in European Application No. 13777209 and received by the EPO on Jul. 11, 2018.

US 10,246,370 B2

COLOR-STRIKABLE GLASS CONTAINERS

The present disclosure is directed to glass containers and, more particularly, to coloring of glass containers.

BACKGROUND AND SUMMARY OF THE DISCLOSURE

Glass containers are often composed of so-called soda-lime glass, also called soda-lime-silica glass. Many such containers are colored, for example, for aesthetic or functional purposes. Colored glass containers may be produced from soda-lime glass compositions which include one or more colorants. For example, green glass can be made from a soda-lime glass composition which includes chromium oxide ($Cr_2O_3$) as a colorant, and blue glass can be made by adding cobalt oxide (CoO) to a soda-lime glass composition. U.S. patents that illustrate colored glass compositions of this type include U.S. Pat. Nos. 3,326,702, 3,330,638, 3,345,190, 3,498,806, and 4,312,953.

Some colorants in soda-lime glass compositions may not immediately impart color to the glass. Instead, color may need to be developed by a heat-treatment process known as "striking." In this process, glass containers are formed from a glass composition which contains "latent" colorant materials. Thereafter, the glass containers are heated to a temperature slightly above normal annealing temperatures so that the latent colorant materials in the glass interact or "strike" to impart color to the glass. U.S. patents that illustrate this method of coloring glass containers include U.S. Pat. Nos. 2,672,423, 3,513,003, and 3,627,548.

A general object, in accordance with one aspect of the disclosure, is to provide a mixture of latent colorant materials that may be introduced into a range of base glass compositions to produce lightly colored or clear glass containers that, upon heat treatment and striking, develop a deep red or visually black color. Accordingly, these glass containers may be referred to as "color-strikable." The heat treatment or striking step is optional, which imparts flexibility to the mass production of different colored glass containers.

The present disclosure embodies a number of aspects that can be implemented separately from or in combination with each other.

In accordance with an aspect of the disclosure, there is provided a mixture of latent colorant materials formulated for use with a plurality of soda-lime silica base glass compositions having redox numbers in the range of −40 to +20 to produce a plurality of color-strikable glass compositions and a plurality of color-strikable glass containers. The mixture of latent colorant materials includes cuprous oxide ($Cu_2O$), stannous oxide (SnO), bismuth oxide ($Bi_2O_3$), and carbon (C).

In accordance with another aspect of the disclosure, there is provided a method of making a plurality of color-strikable glass containers. In this method, a mixture of latent colorant materials is introduced into a soda-lime-silica base glass compositions having a redox number in the range of −40 to +20 to produce a color-strikable glass compositions. The mixture of latent colorant materials includes cuprous oxide ($Cu_2O$), stannous oxide (SnO), bismuth oxide ($Bi_2O_3$), and carbon (C). Thereafter, a plurality of color-strikable glass containers is formed from the color-strikable glass compositions.

In accordance with yet another aspect of the disclosure, there is provided a method of making a plurality of color-strikable glass containers. In this method, a soda-lime-silica glass compositions is prepared including: 60-75 wt. % $SiO_2$, 7-15 wt. % $Na_2O$, 6-12 wt. % CaO, 0.1-3.0 wt. % $Al_2O_3$, 0.0-2.0 wt. % MgO, 0.0-2.0 wt. % $K_2O$, and 0.01-0.30 wt. % $SO_3$, and a latent colorant material composition is mixed into the soda-lime-silica glass composition to produce a color-strikable glass composition including: 0.0875-0.35 wt. % cuprous oxide ($Cu_2O$), 0.06-0.5 wt. % stannous oxide (SnO), 0.0125-0.05 wt. % bismuth oxide ($Bi_2O_3$), and 0.02-0.10 wt. % carbon (C). Thereafter, a plurality of color-strikable glass containers is formed from the color-strikable glass composition.

In accordance with a further aspect of the disclosure, there is provided a color-strikable glass container having a container glass composition including a base glass portion and a latent colorant portion. The base glass portion comprises: 60-75 wt. % $SiO_2$, 7-15 wt. % $Na_2O$, 6-12 wt. % CaO, 0.1-3.0 wt. % $Al_2O_3$, 0.0-2.0 wt. % MgO, 0.0-2.0 wt. % $K_2O$, and 0.01-0.30 wt. % $SO_3$, and the latent colorant portion comprises: 0.0875-0.35 wt. % cuprous oxide ($Cu_2O$), 0.06-0.5 wt. % stannous oxide (SnO), and 0.0125-0.05 wt. % bismuth oxide ($Bi_2O_3$).

BRIEF DESCRIPTION OF THE DRAWINGS

The disclosure, together with additional objects, features, advantages and aspects thereof, will be best understood from the following description, the appended claims and the accompanying drawing, in which:

FIG. 1 is a side elevation of a glass container in accordance with an exemplary embodiment of the present disclosure.

DETAILED DESCRIPTION OF PREFERRED EMBODIMENTS

In accordance with exemplary embodiments of a presently disclosed manufacturing process, a mixture of latent colorant materials has been found, which can be introduced into a plurality of base glass compositions having a range of redox numbers to produce color-strikable glass compositions and color-strikable glass containers. The color-strikable glass containers produced by the presently disclosed manufacturing process are initially lightly colored or clear, but may be heated to a temperature slightly above normal annealing temperatures to strike red or black therein.

As used herein, the term "lightly colored" is a relative term and is meant to refer to glass that is relatively transparent or translucent in comparison to the deeply colored red or black glass containers produced upon striking. In one embodiment, the initially lightly colored color-strikable glass containers may appear colorless or light blue, but upon striking may turn deep red. In another embodiment, the initially lightly colored color-strikable glass containers may have amber, cobalt blue, or emerald green coloration, but upon striking may turn visually black. That is, upon striking, the visible light transmission through the glass containers will be reduced such that the glass containers appear visually black to the human eye in natural lighting conditions (e.g., indirect sunlight) at arm's length.

FIG. 1 illustrates an exemplary embodiment of a glass container 10 that may be produced in accordance with an exemplary embodiment of the presently disclosed manufacturing process, as described further herein below.

The glass container 10 may be produced by the following method. In addition to the following disclosure, exemplary conditions and procedures for composing and melting production container glass can be found in, e.g. the Handbook of Glass Manufacture by Fay V. Tooley (3rd ed., Ashlee Publishing 1984).

The method may include preparing a batch of raw materials, i.e., the starting materials for a color-strikable glass composition. According to embodiments of the present disclosure, the batch of raw materials is formulated to produce a glass composition having an oxidation-reduction potential, or "redox" potential, within a predetermined range. One accepted technique for quantifying the redox potential of molten glass is by calculating its so-called "redox number," as described in Simpson and Myers, "The Redox Number Concept and Its Use by the Glass Technologist," *Glass Technology*, Vol. 19, No. 4, Aug. 4, 1978, pages 82-85. In general, an "oxidizing" glass composition is defined as a glass composition having a redox number of zero or above, and a "reduced" glass composition is defined as a glass composition having a negative redox number. According to embodiments of the present disclosure, the batch of raw materials is formulated to produce a glass composition having a redox number in the range of −40 to +20.

The batch of raw materials may include soda-lime-silica glass precursor materials, which may include base glass materials and, optionally, colorant materials. The base glass materials may include sand ($SiO_2$), soda ash ($Na_2CO_3$), limestone ($CaCO_3$), dolomite ($CaMg(CO_3)_2$), and alumina ($Al_2O_3$)-containing materials such as feldspar, as well as cullet. The colorant materials in the batch of raw materials may be in the form of metal compounds or materials that contain a specific elemental metal or metal compound which produces a desired color in soda-lime glass. Examples of suitable colorant materials may include, for example, iron oxides (e.g., $FeO$ or $Fe_2O_3$), chromium oxides (e.g., $CrO$ or $Cr_2O_3$), and/or cobalt oxides (e.g., $CoO$ or $Co_2O_3$).

The batch of raw materials may further include supplementary materials which have an oxidizing or reducing effect on the glass composition. For example, the batch of raw materials may include one or more oxidizing agents, such as gypsum ($CaSO_4.2H_2O$), salt cake ($Na_2SO_4$), sodium nitrate ($NaNO_3$), and potassium nitrate ($KNO_3$), as well as one or more reducing agents, such as carbon (C), iron pyrite ($FeS_2$), iron chromite ($FeCr_2O_4$), and sulfide sulfur (e.g., as ferrous sulfide, FeS).

The batch of raw materials also may include latent colorant materials. The latent colorant materials may be in the form of a mixture, such as a mixture of suitable copper (Cu), tin (Sn), bismuth (Bi), and carbon (C)-containing materials, which react in the melt to form a redox couple of cuprous oxide ($Cu_2O$), stannous oxide (SnO), and bismuth oxide ($Bi_2O_3$). For example, copper (Cu), tin (Sn), bismuth (Bi), and carbon (C) may be added to the batch of raw materials in elemental form and/or in compound form, for example, in oxide form.

The redox couple of $Cu_2O$, SnO, and $Bi_2O_3$ enables the formation of colloidal copper particles in glass by the heat-treatment process known as "striking." However, this redox couple does not alter the color of the glass until it is suitably heat-treated. The formation of colloidal copper particles in conventional flint or arctic blue base glasses imparts red coloration to the glass. On the other hand, when colloidal copper particles are formed in conventional amber, cobalt blue, or emerald green base glasses, the glass turns visually black in color. Accordingly, this redox couple allows for the production of more than one color of glass from a single color-strikable glass composition. For example, arctic blue glass containers and red glass containers can be produced from a single color-strikable glass composition by striking only a portion of the glass containers formed from the glass composition. As another example, emerald green glass containers and black glass containers can be produced from a single color-strikable glass composition by striking only a portion of the glass containers formed from the glass composition.

The method may include melting the batch of raw materials in a glass batch furnace to produce molten glass. The batch of raw materials may be melted at temperatures preferably between 1400 and 1500 degrees Celsius for about two to four hours, more preferably between 1425 and 1475 degrees Celsius, and most preferably at about 1450 degrees Celsius for about three hours. Thereafter, the molten glass may flow from the tank to a refiner where it is conditioned. From the furnace, the molten glass may be directed toward one or more forehearths.

In one embodiment, referred to herein as a tank coloration method, the batch of raw materials melted in the glass batch furnace may include base glass materials, latent colorant materials, and, optionally, some other colorant materials. When this latent colorant-containing batch of raw materials is melted in the glass batch furnace, a molten color-strikable glass composition is produced. The term "color-strikable" is used herein to mean a glass composition or a formed glass container that includes latent colorant materials, and can be heated to a temperature slightly above normal annealing temperatures so that the latent colorant materials interact or "strike" to change the color to the glass.

In another embodiment, referred to herein as a forehearth coloration method, the batch of raw materials melted in the glass batch furnace may include base glass materials and, optionally, some other colorant materials. However, in this embodiment, the batch of raw materials does not contain any latent colorant materials. When this batch of raw materials is melted in the glass batch furnace, a molten glass composition, for example, of flint, arctic blue, amber, cobalt blue, or emerald green glass is produced. Thereafter, downstream of the batch furnace, latent colorant materials are added to the base glass composition in one or more of the forehearths. In this embodiment, a color-strikable glass composition is prepared by introducing latent colorant materials into a previously prepared base glass in one or more of the forehearths.

A color-strikable glass composition prepared by either method can be thought of as having a base glass portion and a latent colorant portion.

The base glass portion may include soda-lime-silica glass materials. For example, the base glass portion may include substantially the same materials present in a flint, arctic blue, amber, cobalt blue, or emerald green glass.

The term "flint glass" is employed in its conventional sense in glass technology as referring to a generally colorless or clear glass, and may be characterized as an oxidized glass, having a redox number of zero or above. For example, flint glass may have a redox number in the range of about +2 to about +20. A presently preferred flint glass composition may comprise the following materials in the following ranges of amounts by weight:

| | |
|---|---|
| 60-75% | $SiO_2$ |
| 7-15% | $Na_2O$ |
| 6-12% | CaO |
| 0.1-3.0% | $Al_2O_3$ |
| 0.0-2.0% | MgO |

| | |
|---|---|
| 0.0-2.0% | K₂O |
| 0.05-0.30% | SO₃. |

More particularly, and by way of example only, a presently preferred flint glass composition may comprise the following materials in substantially the stated amounts by weight:

| | |
|---|---|
| 73% | SiO₂ |
| 13.3% | Na₂O |
| 10.5% | CaO |
| 1.3% | Al₂O₃ |
| 0.2% | MgO |
| 0.2% | K₂O |
| 0.2% | SO₃. |

The term "arctic blue glass" is likewise employed in its conventional sense and refers to a lightly colored glass having blue tones (e.g., light blue glass). Arctic blue glass also may be characterized as an oxidized glass, having a redox number of zero or above. For example, arctic blue glass may have a redox number in the range of about +2 to about +20. A presently preferred arctic blue glass composition may comprise the following materials in the following ranges of amounts by weight:

| | |
|---|---|
| 60-75% | SiO₂ |
| 7-15% | Na₂O |
| 6-12% | CaO |
| 0.1-3.0% | Al₂O₃ |
| 0.0-2.0% | MgO |
| 0.0-2.0% | K₂O |
| 0.01-0.10% | SO₃ |
| 0.1-0.3% | Fe₂O₃. |

More particularly, and by way of example only, a presently preferred arctic blue glass composition may comprise the following materials in substantially the stated amounts by weight:

| | |
|---|---|
| 73.0% | SiO₂ |
| 12.9% | Na₂O |
| 11.5% | CaO |
| 1.4% | Al₂O₃ |
| 0.1% | MgO |
| 0.5% | K₂O |
| 0.04% | SO₃ |
| 0.2% | Fe₂O₃. |

The term "amber glass" is likewise employed in its conventional sense and refers to a glass having an amber coloration that reduces transmission of light through the glass container. Amber glass may be characterized as a reduced glass, having a redox number of −20 or less. For example, amber glass may have a redox number in the range of about −20 to about −40. A presently preferred amber glass composition may comprise the following materials in the following ranges of amounts by weight:

| | |
|---|---|
| 60-75% | SiO₂ |
| 7-15% | Na₂O |
| 6-12% | CaO |
| 0.1-3.0% | Al₂O₃ |
| 0.0-2.0% | MgO |

| | |
|---|---|
| 0.0-2.0% | K₂O |
| 0.01-0.10% | SO₃ |
| 0.2-0.6% | Fe₂O₃. |

More particularly, and by way of example only, a presently preferred amber glass composition may comprise the following materials in substantially the stated amounts by weight:

| | |
|---|---|
| 73.0% | SiO₂ |
| 13.1% | Na₂O |
| 10.9% | CaO |
| 1.4% | Al₂O₃ |
| 0.4% | MgO |
| 0.4% | K₂O |
| 0.05% | SO₃ |
| 0.4% | Fe₂O₃. |

The term "cobalt blue glass" is likewise employed in its conventional sense and refers to a glass having blue coloration (e.g., blue glass). Cobalt glass may be characterized as a reduced or oxidized glass, having a redox number in the range of about −20 to about +10. A presently preferred cobalt blue glass composition may comprise the following materials in the following ranges of amounts by weight:

| | |
|---|---|
| 60-75% | SiO₂ |
| 7-15% | Na₂O |
| 6-12% | CaO |
| 0.1-3.0% | Al₂O₃ |
| 0.0-2.0% | MgO |
| 0.0-2.0% | K₂O |
| 0.01-0.25% | SO₃ |
| 0.01-0.25% | Fe₂O₃ |
| 0.01-0.15% | CoO. |

More particularly, and by way of example only, a presently preferred cobalt blue glass composition may comprise the following materials in substantially the stated amounts by weight:

| | |
|---|---|
| 73% | SiO₂ |
| 13% | Na₂O |
| 11% | CaO |
| 1.6% | Al₂O₃ |
| 0.5% | MgO |
| 0.4% | K₂O |
| 0.15% | SO₃ |
| 0.10% | Fe₂O₃ |
| 0.06% | CoO. |

The term "emerald green glass" is also employed in its conventional sense and refers to a glass having green coloration. Emerald green glass may be characterized as a reduced glass, having a redox number of about −5. For example, emerald green glass may have a redox number in the range of about +1 to −10. A presently preferred emerald green glass composition may comprise the following materials in the following ranges of amounts by weight:

| | |
|---|---|
| 60-75% | SiO₂ |
| 7-15% | Na₂O |
| 6-12% | CaO |
| 0.1-3.0% | Al₂O₃ |
| 0.0-2.0% | MgO |

| | |
|---|---|
| 0.0-2.0% | $K_2O$ |
| 0.01-0.25% | $SO_3$ |
| 0.01-0.40% | $Cr_2O_3$ |
| 0.1-0.6% | $Fe_2O_3$. |

More particularly, and by way of example only, a presently preferred emerald green glass composition may comprise the following materials in substantially the stated amounts by weight:

| | |
|---|---|
| 73% | $SiO_2$ |
| 13.3% | $Na_2O$ |
| 10.5% | CaO |
| 1.7% | $Al_2O_3$ |
| 0.4% | MgO |
| 0.4% | $K_2O$ |
| 0.08% | $SO_3$ |
| 0.25% | $Cr_2O_3$ |
| 0.3% | $Fe_2O_3$. |

The latent colorant portion of the color-strikable glass composition may include cuprous oxide ($Cu_2O$), stannous oxide (SnO), bismuth oxide ($Bi_2O_3$), and carbon (C). As discussed above, this combination of materials has been found to enable the striking of copper (Cu) (i.e., the formation of copper colloids) in soda-lime glass containers. In addition, when present in suitable amounts, this combination of latent colorant materials will not alter the coloration of the base glass unless an additional heat treatment or striking step is performed. Therefore, use of these latent colorant materials in soda-lime glass compositions can provide flexibility to the production of different colored glass containers on a mass production basis.

The molar ratio of tin oxide (SnO) to copper oxide ($Cu_2O$) in the latent colorant portion may be about one, for example, the molar ratio may be in the range of 0.9-1, or in the range of about 1-0.9. However, the latent colorant portion suitably may contain an excess of tin oxide (SnO). For example, when an excess of tin oxide (SnO) is present in the latent colorant portion, the molar ratio of tin oxide (SnO) to copper oxide ($Cu_2O$) may be about 1.5.

In one embodiment, the color-strikable glass composition may include about 0.175 wt. % cuprous oxide ($Cu_2O$), about 0.25 wt. % stannous oxide (SnO), about 0.0125 wt. % bismuth oxide ($Bi_2O_3$), and about 0.06 wt. % carbon (C). For example, the color-strikable glass composition may include 0.0875-0.35 wt. % cuprous oxide ($Cu_2O$), 0.06-0.5 wt. % stannous oxide (SnO), 0.006-0.05 wt. % bismuth oxide ($Bi_2O_3$), and 0.02-0.10 wt. % carbon (C).

In another embodiment, the color-strikable glass composition may include substantially 0.175 wt. % cuprous oxide ($Cu_2O$), substantially 0.25 wt. % stannous oxide (SnO), substantially 0.0125 wt. % bismuth oxide ($Bi_2O_3$), and substantially 0.06 wt. % carbon (C). As used herein the term "substantially" means within manufacturing tolerances customary in the glass container manufacturing industry.

The remaining portion of color-strikable glass composition may include small amounts of other materials. Such materials may be additives, residual materials from cullet, and/or impurities typical in the glass container manufacturing industry. Such materials may be present in trace amounts, for example, less than 0.2 wt. %. In one specific example, the remaining portion of the color-strikable glass composition may include trace amounts of $TiO_2$, BaO, and/or SrO.

The method also may include forming glass containers from the color-strikable glass composition, and these glass containers may be referred to as "color-strikable." A feeder located at a downstream end of the one or more forehearths may measure out gobs of molten glass and deliver them to glass container-forming machines. Thereafter, the gobs may be formed into glass containers, for example, in individual section machines by press-and-blow or blow-and-blow processes, or in any other suitable manner by any suitable equipment.

The method further may include annealing the color-strikable glass containers in any suitable manner, for example, in an annealing lehr. At an entry, hot end, or upstream portion of the annealing lehr, the temperature therein may be between 550 and 600 degrees Celsius. Through the lehr, the temperature may be brought down gradually to a downstream portion, cool end, or exit of the lehr, for example, to a temperature therein of between 130 degrees Celsius and 65 degrees Celsius. In any event, the color-strikable glass containers may be annealed, preferably between 550 and 600 degrees Celsius for 30 to 90 minutes, more preferably between 525 and 575 degrees Celsius for 45 to 75 minutes, and most preferably at substantially 550 degrees Celsius for one hour.

The method also may include raising the temperature of the color-strikable glass containers above the highest temperature at which they are annealed (i.e., the highest annealing temperature) to strike a red or black coloration into the glass containers. Accordingly, this temperature-raising step may be referred to as "striking."

The striking or temperature-raising step may include, for example, heat-treating the color-strikable glass containers between 600 and 680 degrees Celsius for 10 to 90 minutes to produce struck-black or struck-red glass containers. In a more specific example, the temperature-raising step may include heat-treating the color-strikable glass containers between 630 and 650 degrees Celsius for 30 to 40 minutes.

In one embodiment, the temperature raising or striking step may be carried out after the annealing step. For example, a furnace or secondary lehr may be used in line or off line downstream of the annealing lehr. The temperature of the color-strikable glass containers may be raised in the furnace or secondary lehr to a temperature and for a time suitable to strike a desired color into the glass containers. Thereafter, the temperature of the struck-black or struck-red glass containers may be brought down gradually, for example, according to an annealing schedule to avoid fracture or failure of the containers.

In another embodiment, the temperature raising or striking step may be carried out between the time the annealing step begins and the time the annealing step ends. In one example, a separate furnace may be used off line adjacent to the annealing lehr. In another example, the annealing lehr may be operated in accordance with a modified heating profile. For instance, the modified heating profile may include a typical annealing temperature profile modified to include temperatures and times suitable to strike the desired color in the glass containers before, during, or after annealing.

The glass containers may, in some respects, have a container glass composition that is different from that of the color-strikable glass composition. For example, the amount of sulfur trioxide ($SO_3$) retained in the glass containers may be substantially less than the amount of sulfur trioxide ($SO_3$) used to prepare the color-strikable glass composition. The actual amount of sulfur trioxide ($SO_3$) retained in the glass containers, however, will vary depending on the composition of the base glass and on the amount of carbon (C) in the color-strikable glass composition. In general, the more carbon (C) added to a base glass composition, the less sulfur trioxide ($SO_3$) will be retained in the glass containers.

In suitable embodiments, the amount of trioxide ($SO_3$) retained in the glass containers will be in the range of 0.01-0.22 wt. %. In one specific embodiment, an oxidized glass composition having a redox number in the range of zero to +14 will typically result in glass containers including about 0.04-0.14 wt. % sulfur trioxide ($SO_3$). In another specific embodiment, a reduced glass composition having a redox number in the range of −4 to −40 will typically result in glass containers including about 0.005-0.02 wt. % sulfur trioxide ($SO_3$).

In one representative example, a color-strikable glass composition was prepared by adding latent colorant materials to an arctic blue glass composition. The as-prepared color-strikable glass composition included 0.11 wt. % sulfur trioxide ($SO_3$) and 0.089 wt. % carbon (C), and the glass containers formed from this color-strikable glass composition were found to contain 0.043 wt. % sulfur trioxide ($SO_3$), which is about 40% of the original amount.

The latent colorant materials of $Cu_2O$, SnO, and $Bi_2O_3$ may be largely retained in the container glass composition. For example, about 75-100% of the $Cu_2O$, SnO, and $Bi_2O_3$ in the color-strikable glass composition may be retained in the container glass composition.

According to the present disclosure, a mixture of latent colorant materials is provided that may be introduced into a plurality of base glass compositions having a range of redox numbers to produce color-strikable glass compositions and color-strikable glass containers that can be struck red or black, depending upon the composition of base glass.

In one embodiment, this mixture of latent colorant materials may be introduced into a flint glass or an arctic blue glass having a redox number in the range of +2 to +20 to produce a color-strikable glass composition and color-strikable glass containers that can be struck red. In another embodiment, the mixture of latent colorant materials may be introduced into an amber base glass having a redox number in the range of −20 to −40 to produce a color-strikable glass composition and color-strikable glass containers that can be struck black. In yet another embodiment, the mixture of latent colorant materials may be introduced into a cobalt blue base glass having a redox number in the range of −20 to +10 to produce a color-strikable glass composition and color-strikable glass containers that can be struck black. In a further embodiment, the mixture of latent colorant materials may be introduced into an emerald green base glass having a redox number of about −5 to produce a color-strikable glass composition and color-strikable glass containers that can be struck black.

EXAMPLES

Several glass test samples were prepared in a laboratory environment and color was observed in each sample.

In each of the following examples, a batch of raw materials was prepared and used to produce 300 g of molten glass. The necessary amount of each raw material for each glass composition was weighted out in accordance with standard batch calculation practice common in the glass industry. Thereafter, the raw materials were crushed and ground using a mortar and pestle to break up agglomerate material, and mixed together using a mixer for about ten minutes. While mixing, a crucible was pre-heated in a furnace at 1350 degrees Celsius for about ten minutes. The crucible was removed from the furnace and the entire batch of raw materials was added to the crucible. The crucible was again placed in the furnace, and the temperature of the furnace was increased to form a glass melt having a temperature of about 1450 degrees Celsius. The glass melt was held at that temperature for about 3.5 hours.

Thereafter, the molten glass was poured into splat quenched patties. Some of the patties were placed in an annealing oven at 550 degrees Celsius, while some of the patties were not annealed. The patties which were placed in the annealing oven were annealed at a temperature of about 550 degrees Celsius for about 10 to 20 minutes, and then a door of the annealing oven was cracked open until the annealing oven temperature decreased to a temperature of about 300 degrees Celsius. Thereafter, the annealing oven temperature was set to 20 degrees Celsius to let the glass cool down to room temperature overnight.

Example 1

In this example, a batch of raw materials was prepared and used to produce 300 g of color-strikable glass. The batch included the necessary raw materials for a flint glass composition, as well as suitable amounts of the latent colorant materials.

After the color-strikable glass patties were annealed, they were heat treated at oven temperatures of 550, 600, and 650 degrees Celsius for durations of 30, 60, 90, 120, 150, and 180 minutes. At 550 degrees Celsius, uniform striking and a good red color was observed after 150 minutes. At 600 and 650 degrees Celsius, the samples struck a shade of red within 30 minutes and then continued to darken in color to almost black by 180 minutes.

Example 2

In this example, the batch of raw materials included the necessary raw materials for a cobalt blue glass composition, as well as suitable amounts of the latent colorant materials.

After the color-strikable glass patties were annealed, they were heat treated at oven temperatures of 550, 600, and 650 degrees Celsius for durations of 15 to 90 minutes. At 600 and 650 degrees Celsius, the samples struck black by 30 minutes.

Example 3

In this example, the batch of raw materials included the necessary raw materials for an emerald green glass composition, as well as suitable amounts of the latent colorant materials.

The ratio of carbon in this mixture was at a standard ratio of carbon to silica for an emerald green glass. This differs from flint glass (above) in that relatively more carbon is present. To produce emerald green glass, a redox number between −5.3 and −5.8 may be sought, and may be obtained by adjusting the amount of carbon in the batch.

There thus has been disclosed suitable methods of producing a color-strikable glass composition and color-strikable glass containers that fully satisfy all of the objects and aims previously set forth. The disclosure has been presented in conjunction with several exemplary embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A method of making glass containers, the method including the steps of:
   preparing a soda-lime-silica glass composition including: 60-75 wt. % $SiO_2$, 7-15 wt. % $Na_2O$, 6-12 wt. % CaO, 0.1-3.0 wt. % $Al_2O_3$, 0.0-2.0 wt. % MgO, 0.0-2.0 wt. % $K_2O$, 0.01-0.25 wt. % $SO_3$, and at least one colorant selected from the group consisting of: iron oxide ($Fe_2O_3$), cobalt oxide (CoO), and chromium oxide ($Cr_2O_3$), wherein the molten glass comprises 0.2-0.6 wt. % iron oxide ($Fe_2O_3$) when the at least one colorant comprises iron oxide ($Fe_2O_3$);
   mixing a latent colorant material composition into the soda-lime-silica glass composition to produce a color-strikable glass composition including: 0.0875-0.35 wt. % cuprous oxide ($Cu_2O$), 0.06-0.5 wt. % stannous oxide (SnO), 0.0125-0.05 wt. % bismuth oxide ($Bi_2O_3$), and 0.02-0.10 wt. % carbon (C);
   forming glass containers from the color-strikable glass composition;
   annealing the glass containers; and
   raising the temperature of a first one of the glass containers above a highest annealing temperature to impart red or black coloration thereto to produce a red or black glass container,
   wherein a second one of the glass containers is not heated to a temperature above the highest annealing temperature, and wherein the second one of the glass containers exhibits arctic blue, amber, cobalt blue, or emerald green coloration.

2. The method set forth in claim 1 wherein the temperature of the first one of the glass containers is raised above 600 degrees Celsius to strike red or black coloration therein and the temperature of the second one of the glass containers is maintained at a temperature below 600 degrees Celsius.

3. The method set forth in claim 1 wherein the soda-lime-silica glass composition includes 0.2-0.3 wt. % $Fe_2O_3$, the temperature of the first one of the glass containers is raised above the highest annealing temperature to produce a red glass container, and the second one of the glass containers exhibits arctic blue coloration.

4. The method set forth in claim 1 wherein the soda-lime-silica glass composition includes 0.2-0.6 wt. % $Fe_2O_3$, the temperature of the first one of the glass containers is raised above the highest annealing temperature to produce a black glass container, and the second one of the glass containers exhibits amber coloration.

5. The method set forth in claim 1 wherein the soda-lime-silica glass composition includes 0.01-0.15 wt. % CoO, the temperature of the first one of the glass containers is raised above the highest annealing temperature to produce a black glass container, and the second one of the glass containers exhibits cobalt blue coloration.

6. The method set forth in claim 1 wherein the soda-lime-silica glass composition includes 0.01-0.4 wt. % $Cr_2O_3$, the temperature of the first one of the glass containers is raised above the highest annealing temperature to produce a black glass container, and the second one of the glass containers exhibits emerald green coloration.

7. A method of making glass containers, the method including:
   (a) providing a mixture of latent colorant materials including cuprous oxide ($Cu_2O$), stannous oxide (SnO), bismuth oxide ($Bi_2O_3$), and carbon (C);
   (b) mixing the mixture of latent colorant materials with soda-lime-silica glass precursor materials to produce a batch of raw materials, wherein the soda-lime-silica glass precursor materials include at least one colorant selected from the group consisting of iron oxide, cobalt oxide, and chromium oxide;
   (c) melting the batch of raw materials in a glass batch furnace to produce molten glass having a color-strikable glass composition that includes at least one colorant selected from the group consisting of: iron oxide ($Fe_2O_3$), cobalt oxide (CoO), and chromium oxide ($Cr_2O_3$), wherein the molten glass comprises 0.2-0.6 wt. % iron oxide ($Fe_2O_3$) when the at least one colorant comprises iron oxide ($Fe_2O_3$);
   (d) forming glass containers from the molten glass;
   (e) annealing the glass containers; and
   (f) raising the temperature of a first one of the glass containers above a highest annealing temperature to impart red or black coloration thereto to produce a red or black glass container,
   wherein a second one of the glass containers is not heated to a temperature above the highest annealing temperature, and wherein the second one of the glass containers exhibits arctic blue, amber, cobalt blue, or emerald green coloration.

8. The method set forth in claim 7 wherein the temperature of the first one of the glass containers is raised above 600 degrees Celsius to strike red or black coloration therein, and wherein the temperature of the second one of the glass containers is maintained at a temperature below 600 degrees Celsius.

9. The method set forth in claim 7 wherein the color-strikable glass composition includes 0.2-0.3 wt. % $Fe_2O_3$, the temperature of the first one of the glass containers is raised above the highest annealing temperature to produce a red glass container, and the second one of the glass containers exhibits arctic blue coloration.

10. The method set forth in claim 7 wherein the color-strikable glass composition includes 0.2-0.6 wt. % $Fe_2O_3$, the temperature of the first one of the glass containers is raised above the highest annealing temperature to produce a black glass container, and the second one of the glass containers exhibits amber coloration.

11. The method set forth in claim 7 wherein the color-strikable glass composition includes 0.01-0.15 wt. % CoO, the temperature of the first one of the glass containers is raised above the highest annealing temperature to produce a black glass container, and the second one of the glass containers exhibits cobalt blue coloration.

12. The method set forth in claim 7 wherein the color-strikable glass composition includes 0.01-0.4 wt. % $Cr_2O_3$, the temperature of the first one of the glass containers is raised above the highest annealing temperature to produce a black glass container, and the second one of the glass containers exhibits emerald green coloration.

* * * * *